United States Patent
Zhang et al.

(10) Patent No.: US 9,872,330 B2
(45) Date of Patent: Jan. 16, 2018

(54) APPARATUS AND METHOD FOR AVOIDING DATA LOSS FOLLOWING AN INTER-PDSN HANDOFF BASED ON A SIMPLE IP NETWORK

(71) Applicant: QUALCOMM Incorporated, San Diego, CA (US)

(72) Inventors: Weiye Zhang, Beijing (CN); Haichao Song, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/101,393

(22) PCT Filed: Jan. 3, 2014

(86) PCT No.: PCT/CN2014/000008
§ 371 (c)(1),
(2) Date: Jun. 2, 2016

(87) PCT Pub. No.: WO2015/100683
PCT Pub. Date: Jul. 9, 2015

(65) Prior Publication Data
US 2016/0309540 A1 Oct. 20, 2016

(51) Int. Cl.
*H04W 4/00* (2009.01)
*H04W 76/04* (2009.01)
(Continued)

(52) U.S. Cl.
CPC ....... *H04W 76/045* (2013.01); *H04L 61/1529* (2013.01); *H04L 61/2007* (2013.01);
(Continued)

(58) Field of Classification Search
CPC .......... H04L 2012/5608; H04W 84/12; H04W 88/08; H04W 80/04; H04W 88/06; H04W 84/18; H04W 74/08; H04W 80/00
(Continued)

(56) References Cited

U.S. PATENT DOCUMENTS 6,834,050 B1   12/2004   Madour et al.
6,894,994 B1 *  5/2005   Grob .................... H04B 1/7103
                                                  370/335
(Continued)

FOREIGN PATENT DOCUMENTS

CN        102781039 A    11/2012
WO        2002047407      6/2002

OTHER PUBLICATIONS

International Search Report and Written Opinion—PCT/CN2014/000008—ISA/EPO—dated Oct. 10, 2010.
(Continued)

*Primary Examiner* — Brenda H Pham
(74) *Attorney, Agent, or Firm* — Muncy, Geissler, Olds & Lowe, P.C./QUALCOMM

(57) ABSTRACT

The disclosure is related to avoiding data loss following a handoff from a second packet data serving node (PDSN) back to a first PDSN before an expiration of a session inactivity timer at the first PDSN. An aspect includes detecting, by an access terminal, a handoff from the first PDSN to the second PDSN, in response to the detecting, starting, by the access terminal, a session keep timer corresponding to the session inactivity timer, the session inactivity timer indicating a maximum amount of time the first PDSN will maintain an inactive communication session with the access terminal, and, based on whether the session keep timer has
(Continued)

expired, transmitting, by the access terminal, a plurality of data packets to a server until an acknowledgment is received from the server.

30 Claims, 14 Drawing Sheets

(51) Int. Cl.
*H04W 36/12* (2009.01)
*H04L 29/12* (2006.01)
*H04W 48/16* (2009.01)

(52) U.S. Cl.
CPC ......... *H04L 61/2076* (2013.01); *H04W 36/12* (2013.01); *H04W 48/16* (2013.01)

(58) Field of Classification Search
USPC ............... 370/310.2, 328, 338, 349, 331
See application file for complete search history.

(56) References Cited

U.S. PATENT DOCUMENTS

| | | | |
|---|---|---|---|
| 6,907,016 B2 | 6/2005 | Madour et al. | |
| 7,079,511 B2 | 7/2006 | Abrol et al. | |
| 7,082,130 B2 | 7/2006 | Borella et al. | |
| 7,359,353 B2 | 4/2008 | Sayeedi | |
| 7,415,026 B2 | 8/2008 | Hsu et al. | |
| 8,027,305 B1* | 9/2011 | Rogers | H04W 48/20 370/331 |
| 2002/0064144 A1 | 5/2002 | Einola et al. | |
| 2002/0133457 A1* | 9/2002 | Gerlach | G06Q 20/10 705/39 |

OTHER PUBLICATIONS

3rd Generation Partnership Project 2, cdma2000 Wireless IP network Standard: Simple IP and Mobile IP services, 3GPP2 X.S0011-002-C, V3.0, Oct. 2006, 47 pages.

\* cited by examiner

APPARATUS AND METHOD FOR AVOIDING DATA LOSS FOLLOWING AN INTER-PDSN HANDOFF BASED ON A SIMPLE IP NETWORK

CROSS-REFERENCE TO RELATED APPLICATIONS

This application is the U.S. National Stage Entry under 35 U.S.C. §371 of International Application No. PCT/CN2014/000008, filed on Jan. 3, 2014, which is incorporated herein in its entirety.

BACKGROUND

1. Field of the Invention

Embodiments of the disclosure are related to avoiding data loss following an inter-packet data serving node (PDSN) handoff based on a simple Internet protocol (IP) network.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

The disclosure is related to avoiding data loss following a handoff from a second packet data serving node (PDSN) back to a first PDSN before an expiration of a session inactivity timer at the first PDSN. A method for avoiding data loss following a handoff from a second PDSN back to a first PDSN before an expiration of a session inactivity timer at the first PDSN includes detecting, by an access terminal, a handoff from the first PDSN to the second PDSN, in response to the detecting, starting, by the access terminal, a session keep timer corresponding to the session inactivity timer, the session inactivity timer indicating a maximum amount of time the first PDSN will maintain an inactive communication session with the access terminal, and, based on whether the session keep timer has expired, transmitting, by the access terminal, a plurality of data packets to a server until an acknowledgment is received from the server.

An apparatus for avoiding data loss following a handoff from a second packet data serving node (PDSN) back to a first PDSN before an expiration of a session inactivity timer at the first PDSN includes logic configured to cause an access terminal to detect a handoff from the first PDSN to the second PDSN, logic configured to cause the access terminal to start, in response to detecting the handoff, a session keep timer corresponding to the session inactivity timer, the session inactivity timer indicating a maximum amount of time the first PDSN will maintain an inactive communication session with the access terminal, and logic configured to cause the access terminal to transmit, based on whether the session keep timer has expired, a plurality of data packets to a server until an acknowledgment is received from the server.

An apparatus for avoiding data loss following a handoff from a second packet data serving node (PDSN) back to a first PDSN before an expiration of a session inactivity timer at the first PDSN includes means for causing an access terminal to detect a handoff from the first PDSN to the second PDSN, means for causing the access terminal to start, in response to detecting the handoff, a session keep timer corresponding to the session inactivity timer, the session inactivity timer indicating a maximum amount of time the first PDSN will maintain an inactive communication session with the access terminal, and means for causing the access terminal to transmit, based on whether the session keep timer has expired, a plurality of data packets to a server until an acknowledgment is received from the server.

A non-transitory computer-readable medium for avoiding data loss following a handoff from a second packet data serving node (PDSN) back to a first PDSN before an expiration of a session inactivity timer at the first PDSN includes at least one instruction to cause an access terminal to detect a handoff from the first PDSN to the second PDSN, at least one instruction to cause the access terminal to start, in response to detecting the handoff, a session keep timer corresponding to the session inactivity timer, the session inactivity timer indicating a maximum amount of time the first PDSN will maintain an inactive communication session with the access terminal, and at least one instruction to cause the access terminal to transmit, based on whether the session keep timer has expired, a plurality of data packets to a server until an acknowledgment is received from the server.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
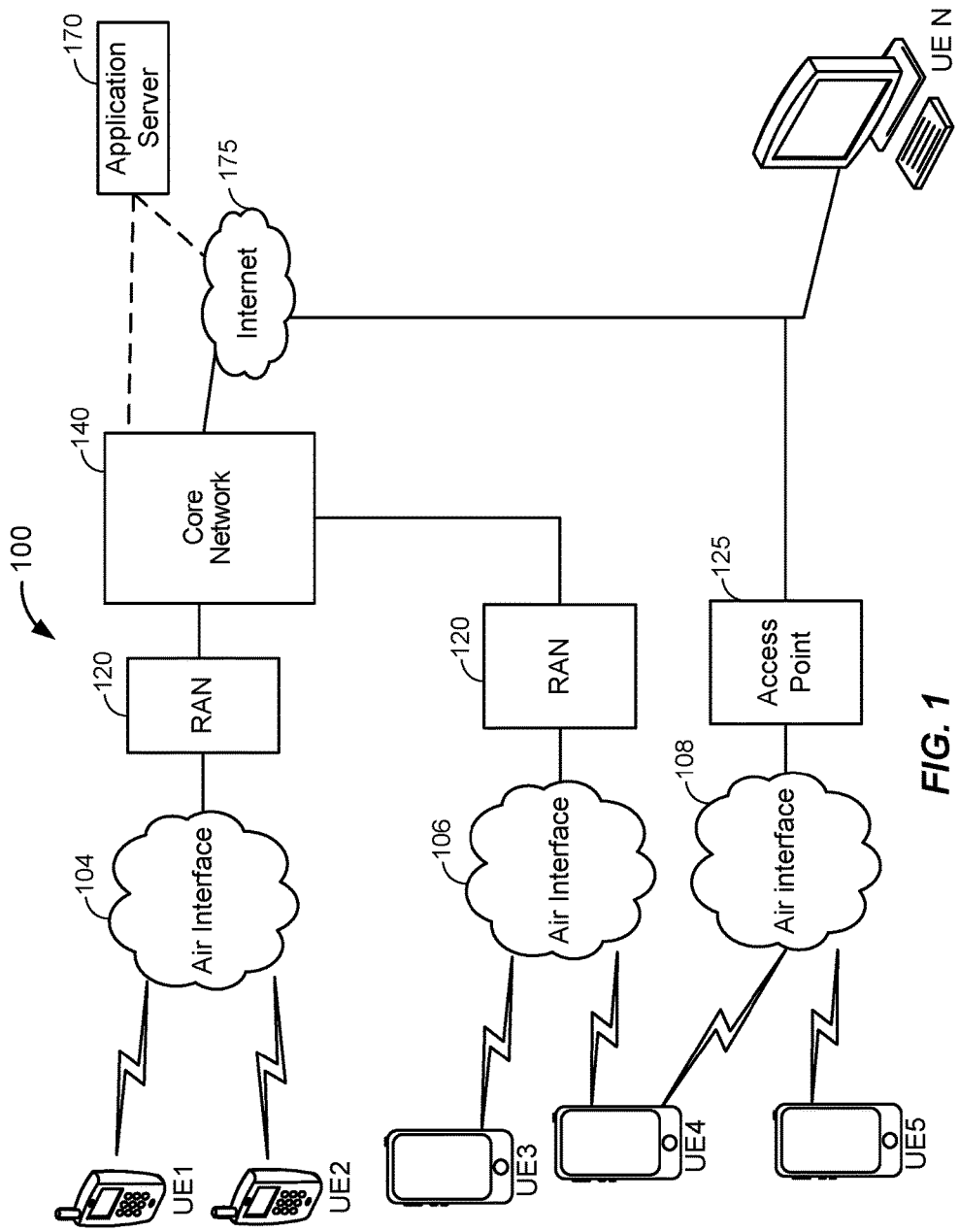
FIG. 1 illustrates a high-level system architecture of a wireless communications system in accordance with an embodiment of the invention.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
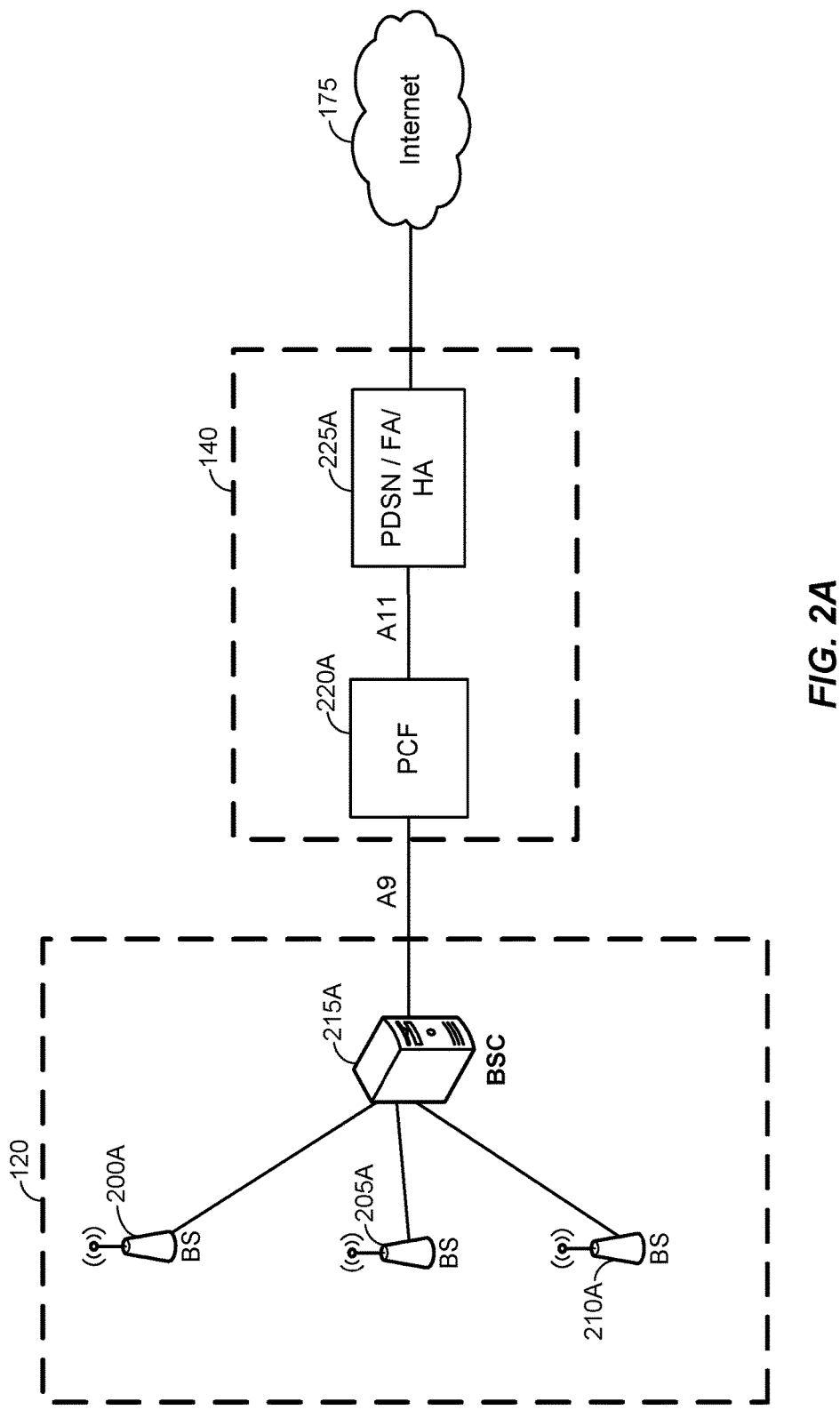
FIG. 2A illustrates an example configuration of a radio access network (RAN) and a packet-switched portion of a core network for a 1× EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point Protocol (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
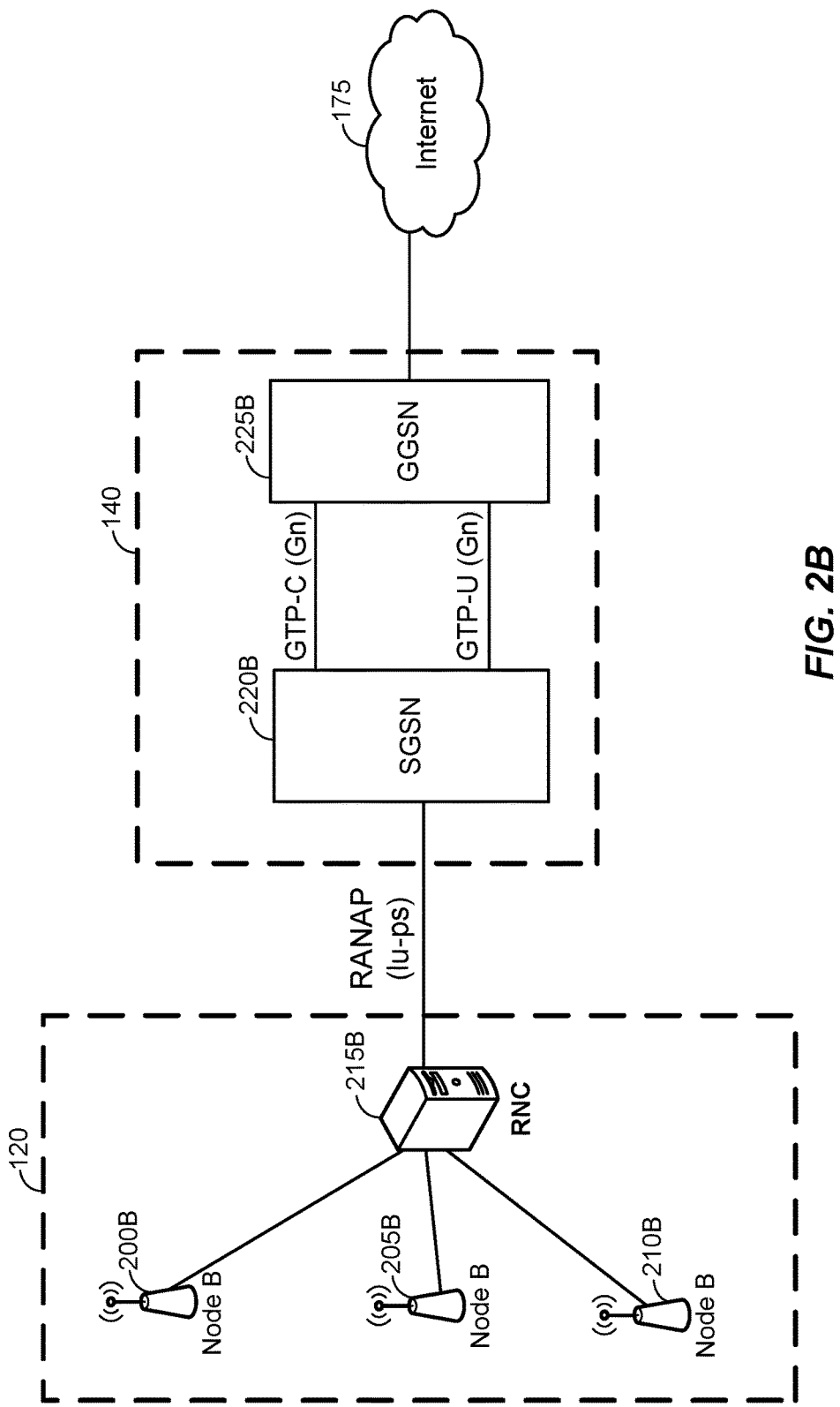
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the disclosure. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., International Mobile Subscriber Identity (IMSI), PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
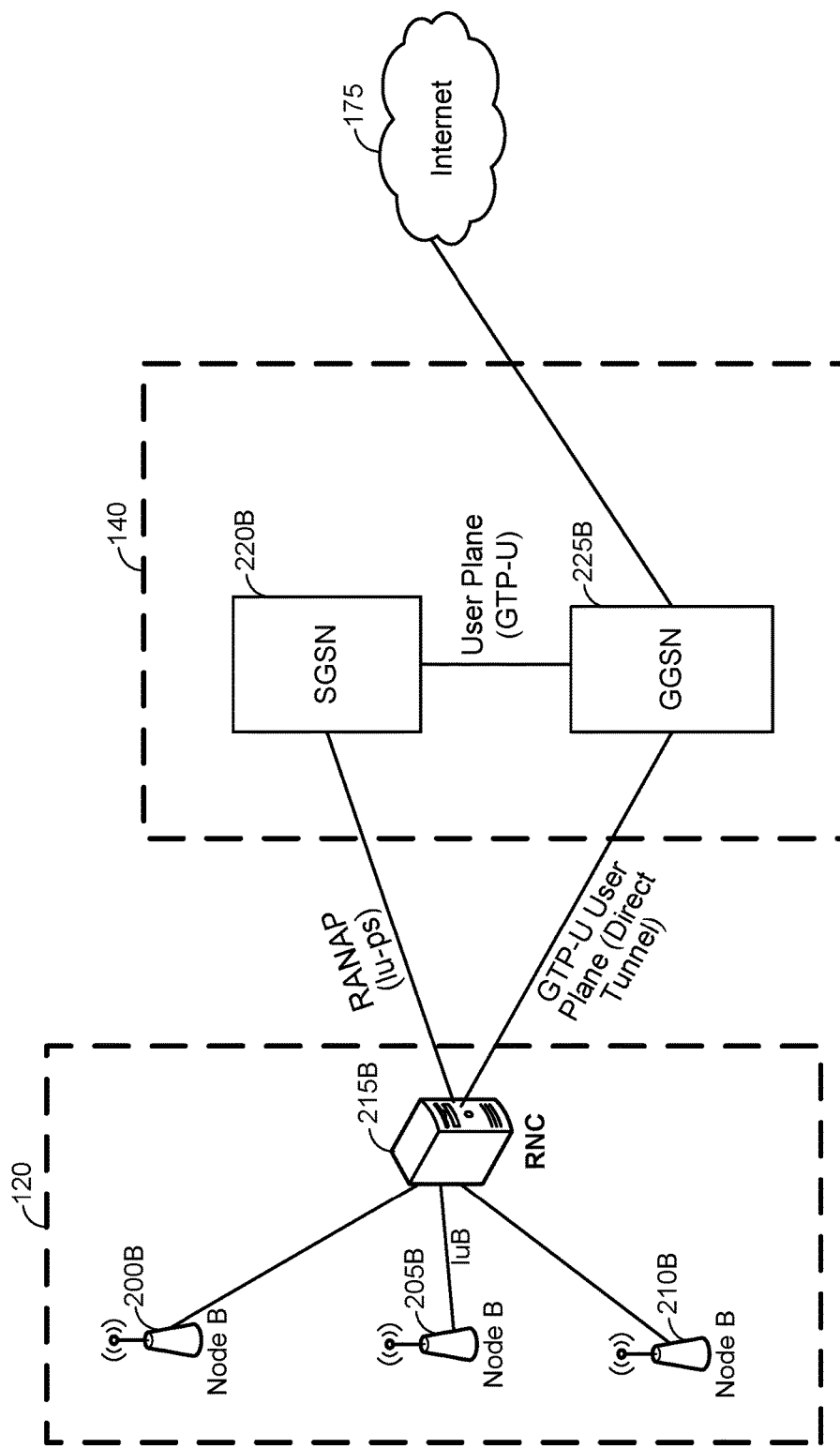
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
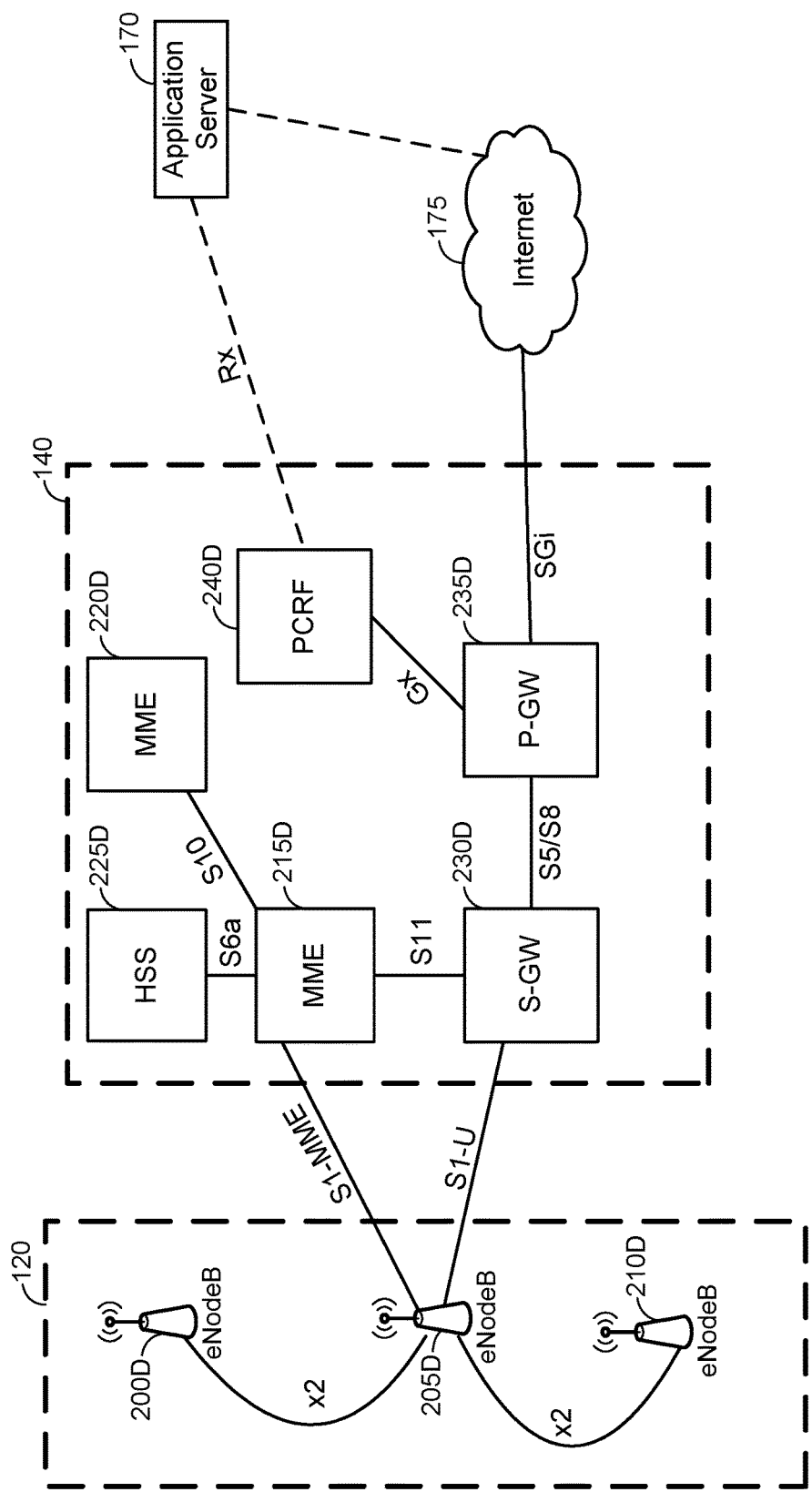
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the disclosure. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
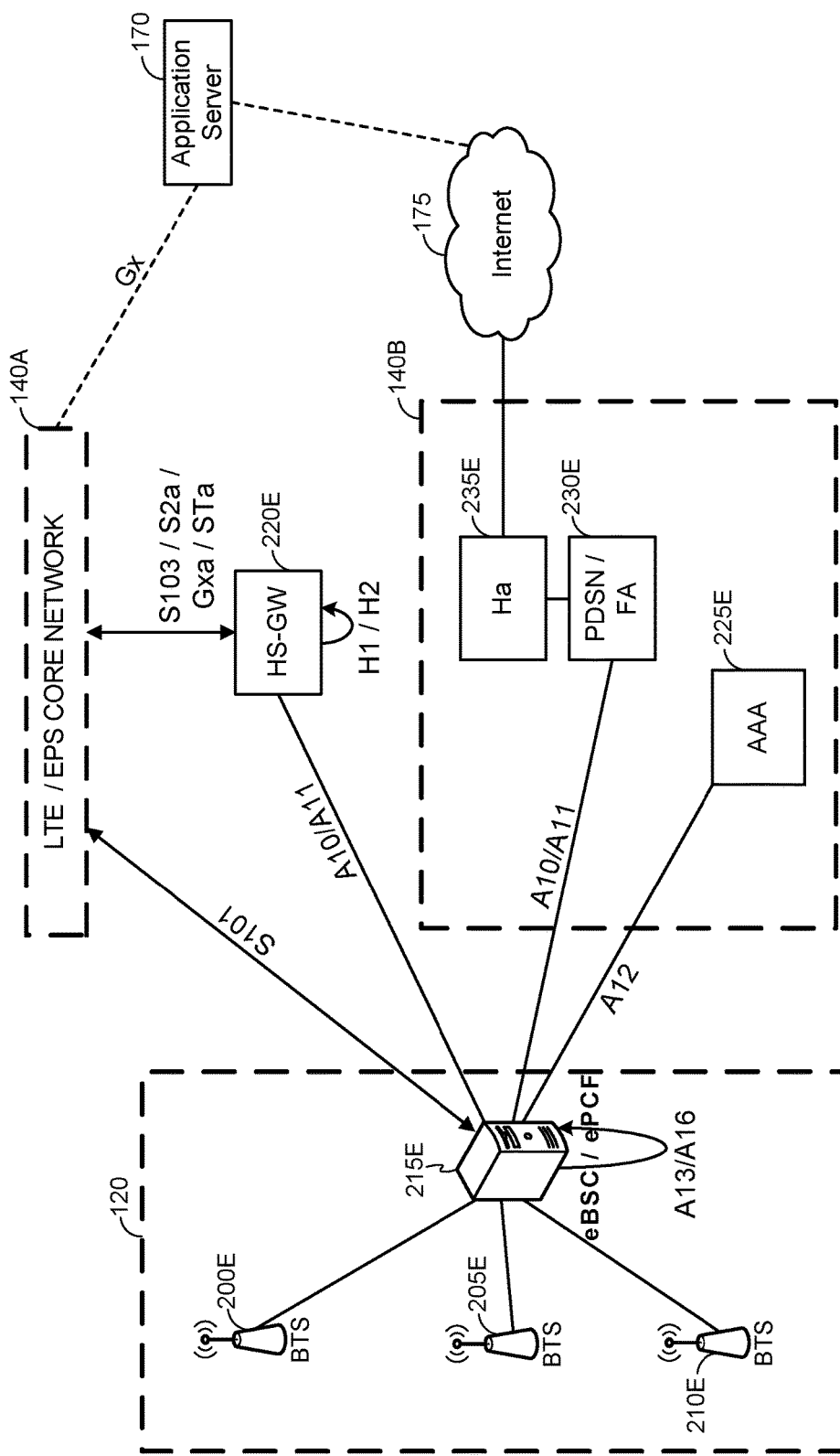
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

PPP will, by default, be "always on" for VoIP in 3G and 4G networks. For the Simple IP protocol, an access terminal must obtain a new IP address (and lose existing connections) every time it changes its point of attachment to the network. That is, moving from the coverage area of one PDSN to the coverage area of another PDSN constitutes a change in packet data session because a new IP address is assigned by the new PDSN. A packet data session and a PPP session are concurrent in Simple IP. That is, the existence of the packet data session is dependent upon a PPP session.

When using Simple IP, if an AT hands off to a second PDSN then returns to the first PDSN within a certain period of time (called "go and back"), the incoming IP path will be blocked. The reason for this is that the first PDSN maintains the old PPP session until a "Max PPP inactivity timer" expires, and it will not assign a new IP address to the AT until after the timer expires. On handoff, however, the second PDSN assigns the AT a new IP address and the AT registers this new IP address with the VoIP server. As such, even though the AT has moved back to the first PDSN, the VoIP server will only have the new IP address of the AT as assigned by the second PDSN until the "Max PPP inactivity timer" expires and the first PDSN assigns the AT a new IP address. Thus, when there is a VoIP call before the "Max PPP inactivity timer" expires, the data packets for the incoming call will be sent to the second PDSN, preventing the AT from receiving the VoIP call.

To overcome this issue, the AT can send multiple IP packets (e.g., PING packets) to the first PDSN, forcing it to re-synchronize the PPP connection. The number of IP packets should be larger than the threshold setting at the PDSN. The AT can then re-register the IP address assigned by the first PDSN with the VoIP server, so that the IP path from the VoIP server to the AT is recovered.

Figure 3A:
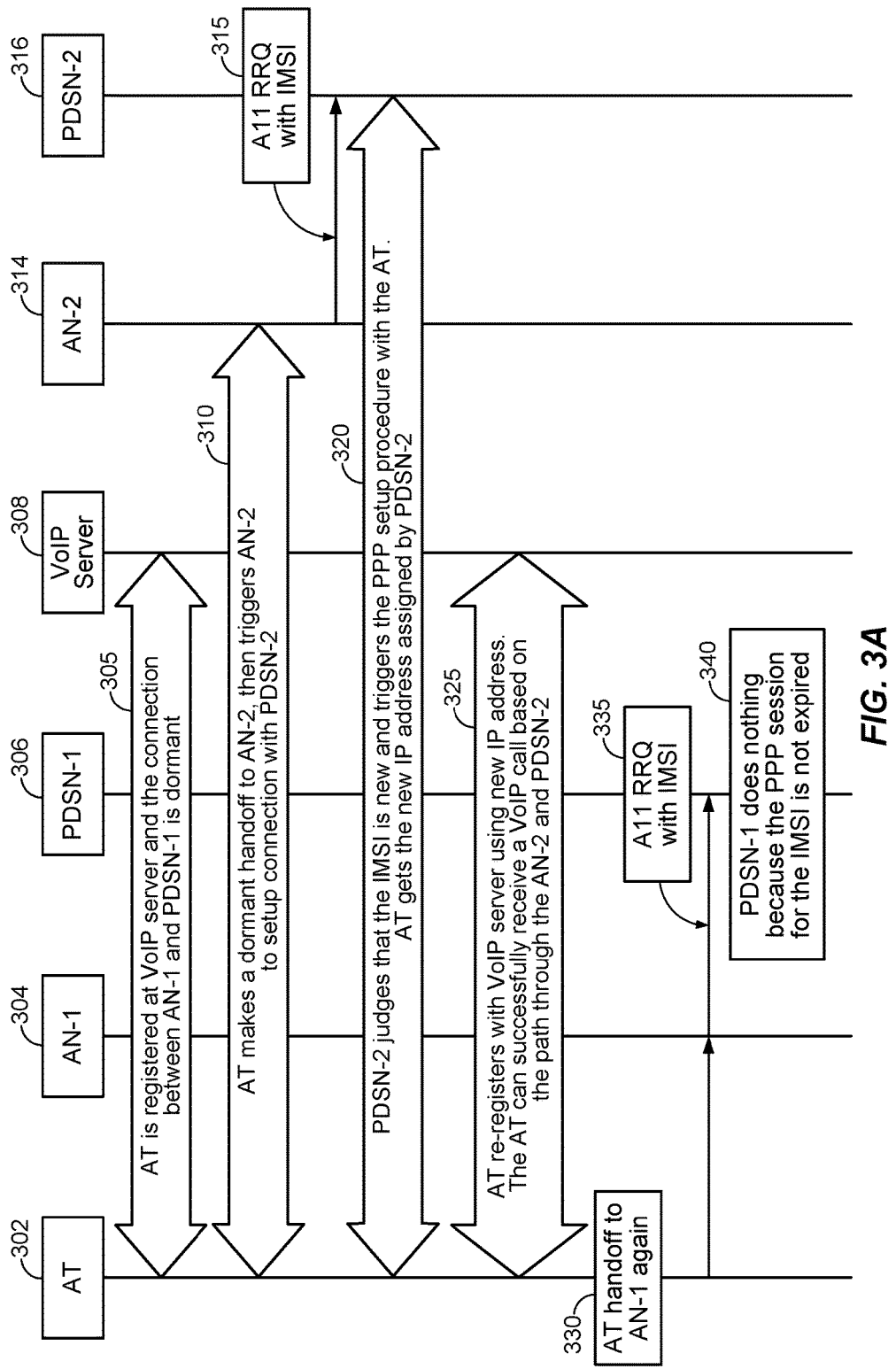
FIGS. 3A and 3B illustrate an exemplary call flow for avoiding data loss following a handoff from a second packet data serving node (PDSN) back to a first PDSN before the expiration of a point-to-point protocol (PPP) inactivity timer at the first PDSN.
Figure 3B:
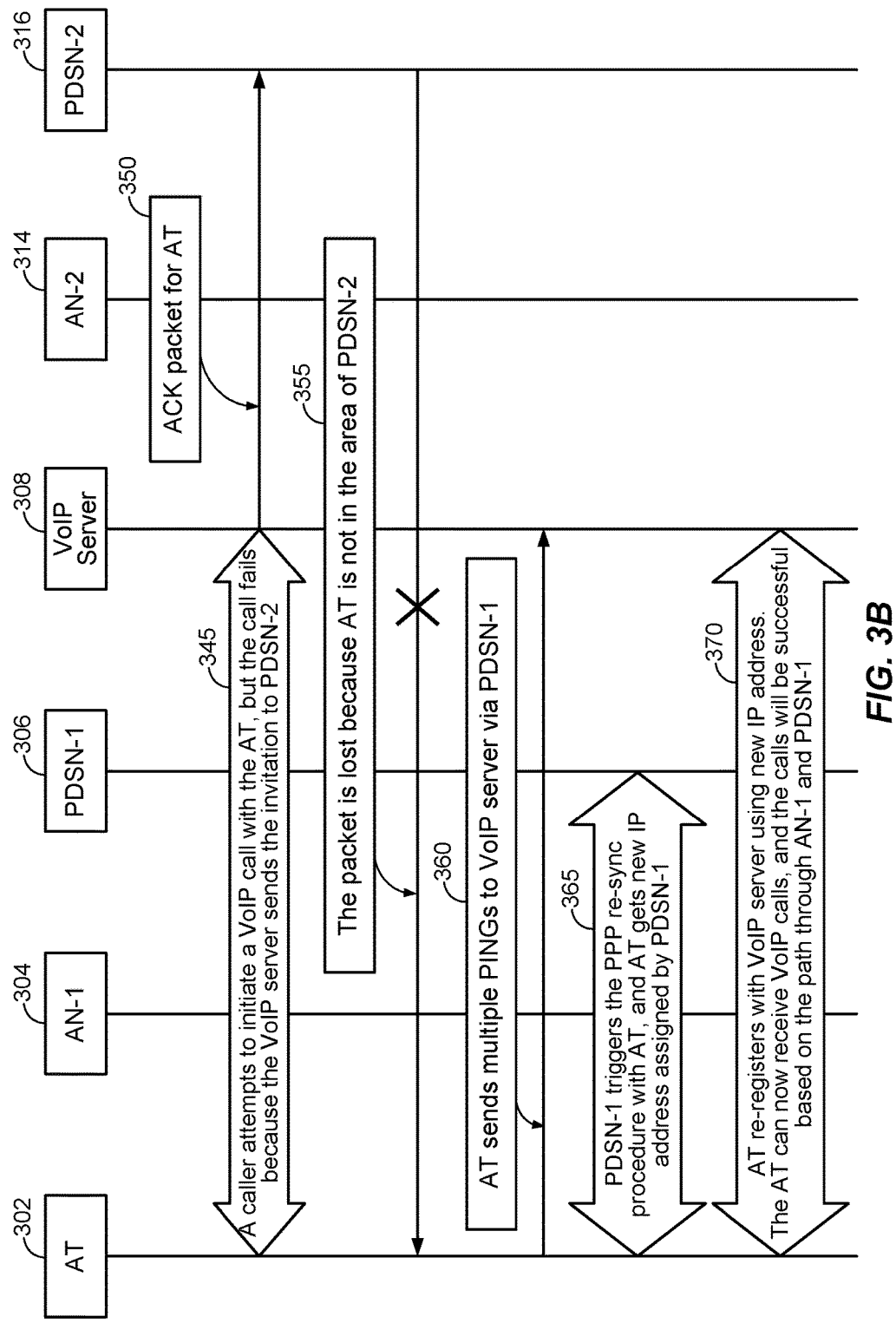

FIGS. 3A and 3B illustrate an exemplary call flow for avoiding data loss following such an inter-PDSN handoff. Referring to FIG. 3A, the flow begins at 305, where an AT 302 utilizing Simple IP is registered with a VoIP server 308 and the connection between a first access network (AN-1) 304, such as a RAN 120 in FIG. 1, and a first PDSN (PDSN-1) 306, such as a PDSN 225A in FIG. 2A or a PDSN 230E in FIG. 2E, is dormant. At 310, the AT 302 makes a dormant handoff to a second access network (AN-2) 314, such as a RAN 120 in FIG. 1, which triggers the AN-2 314 to setup a connection with a second PDSN (PDSN-2) 316. At 315, the AN-2 314 sends a registration request (RRQ) with the IMSI of the AT 302 to the PDSN-2 316 to setup the connection between the AT 302 and the PDSN-2 316.

At 320, the PDSN-2 316 determines that the received IMSI is new and in response triggers the PPP setup procedure with the AT 302. The AT 302 receives the new IP address assigned by the PDSN-2 316. At 325, the AT 302 re-registers with the VoIP server 308 using its new IP address. If there is a VoIP call at this point, it should successfully be completed using the path through the AN-2 304 and the PDSN-2 316.

At 330, the AT 302 hands back off to the AN-1 304. At 335, the AN-1 304 sends an RRQ with the IMSI of the AT 302 to the PDSN-1 306. However, at 340, the PDSN-1 306 does nothing because the PPP session for that IMSI has not yet expired (i.e., the "Max PPP inactivity timer" has not expired).

The flow illustrated in FIG. 3A continues in FIG. 3B. Referring to FIG. 3B, if, as illustrated at 345, if a caller attempts to initiate a VoIP call with the AT 302, the call will fail because the VoIP server 308 will send the call invitation and any other call signaling to the PDSN-2 316. Specifically, at 350, the VoIP server 308 sends an acknowledgement (ACK) packet for the AT 302 to the PDSN-2 316. However, at 355, the packet is lost because the AT 302 is not in the area served by the PDSN-2 316.

At 360, the AT 302 sends multiple PING messages to the VoIP server 308 via the PDSN-1 306, as will be described in more detail with reference to FIG. 4. The responses, e.g., ACKs, to the PING messages will not be received at the AT 302 because the AT 302 is in the coverage area of the PDSN-1 306 but the VoIP server 308 sends the responses to the IP address assigned to the AT 302 by the PDSN-2 316. The AT 302 will not receive a response to these PING messages until it sends the number of packets required by the PDSN-1 306 to trigger the resynchronization of the PPP session. Once it does, then at 365, the PDSN-1 306 triggers the PPP re-synchronization procedure with the AT 302 and assigns the AT 302 a new IP address. At 370, the AT 302 re-registers with the VoIP server 308 using the new IP address. The AT 302 can then receive VoIP calls, and the calls should now be successfully completed over the path from the AN-1 304 to the PDSN-1 306.

As shown in FIGS. 3A and 3B, an incoming VoIP call will be blocked until the "Max PPP inactivity timer" expires, unless the AT 302 sends the multiple PING messages at 360. Specifically, if the AT 302 makes a dormant handoff to a second PDSN, e.g., PDSN-2 316, the second PDSN detects that a new AT is attaching, re-synchronizes the PPP session, and assigns a new IP address to the AT 302. However, when the AT 302 returns to the area of the first PDSN, e.g., PDSN-1 306, with the IP address assigned by the second PDSN, the PPP re-synchronization will not happen because the old PPP session is still stored in the first PDSN. Although the AT 302 could send IP packets to the VoIP server 308, as shown at 345-355, any responses from the VoIP server 308 will be discarded by the second AN, e.g., AN-2 314, because AT 302 is not in the area served by the second PDSN.

The AT 302 can force the PDSN-1 306 to resynchronize the PPP session by sending multiple PING packets, as shown in 360 of FIG. 3B. The AT 302 monitors the changing network status, and sends the multiple PING packets in response to certain network status changes, as will now be discussed with reference to FIG. 4.

Figure 4:
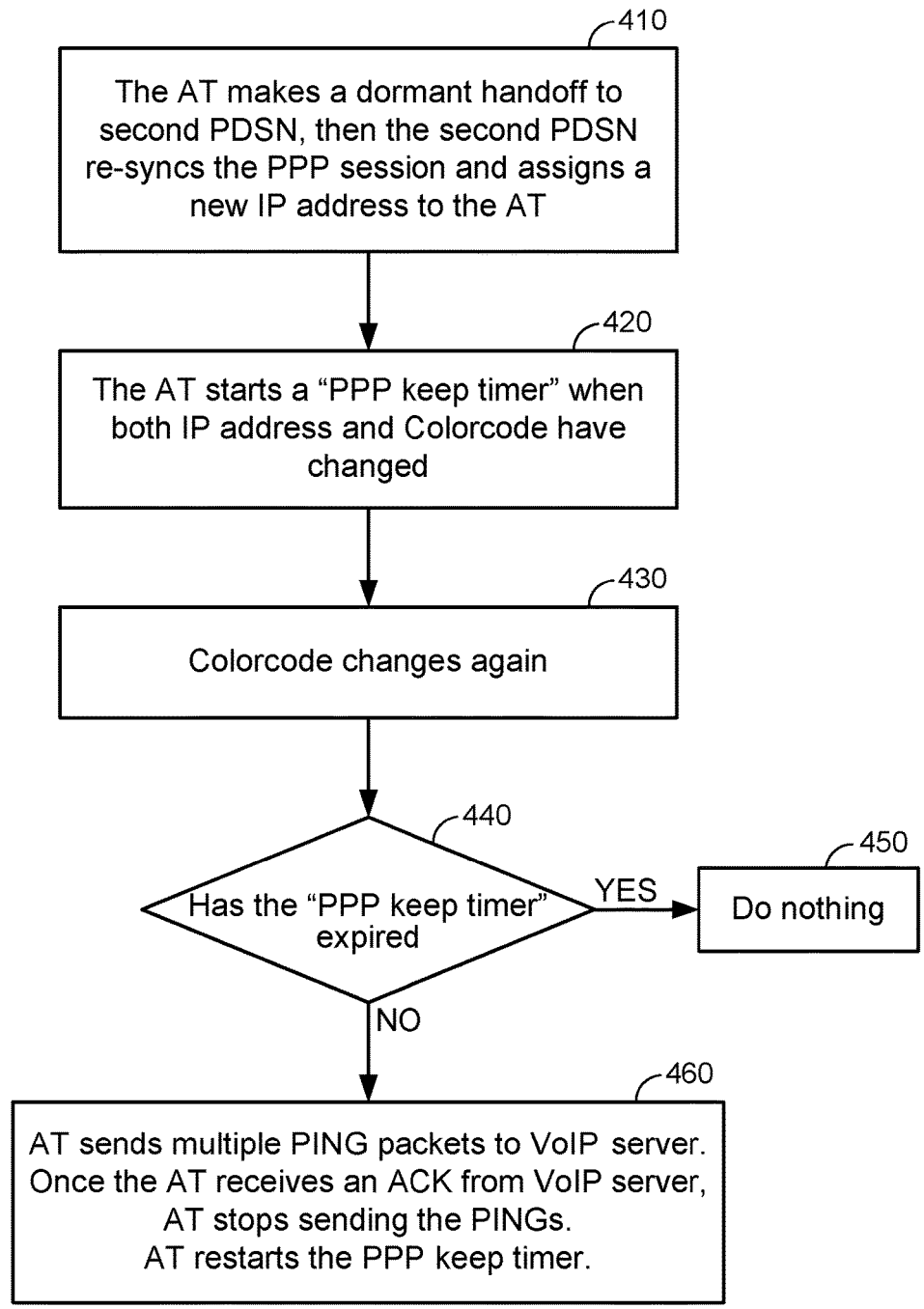
FIG. 4 illustrates an exemplary flowchart for avoiding data loss following a handoff from a second PDSN back to a first PDSN before the expiration of a PPP inactivity timer at the first PDSN.

FIG. 4 illustrates an exemplary flowchart for avoiding data loss following a handoff from a second PDSN back to a first PDSN before the expiration of a PPP inactivity timer at the first PDSN. The flow illustrated in FIG. 4 may be performed by an AT, such as AT 302 in FIG. 3.

At 410, the AT makes a dormant handoff to a second PDSN, such as PDSN-2 316 in FIGS. 3A-B. The second PDSN re-synchronizes the PPP connection with the AT and assigns a new IP address to the AT. At 420, the AT starts a timer called "PPP keep timer" when it detects that its IP address and Colorcode have changed. The length of the "PPP keep timer" is the same as the length of the "Max PPP inactivity timer" of a PDSN. The Colorcode is the label of a BSC or an RNC. A Colorcode change means that the AT is being served by another BSC or RNC. Note that one PDSN may support a number of BSCs or RNCs, so a Colorcode change does not necessarily mean that the PDSN has changed.

At 430, the AT detects that its Colorcode has changed again. At 440, the AT determines whether or not its "PPP keep timer" has expired. If the "PPP keep timer" has expired, then at 450, the AT does not need to do anything, as the first PDSN's "Max PPP inactivity timer" has expired and will not prevent it from re-synchronizing with the first PDSN.

If, however, the "PPP keep timer" has not expired, i.e., has not exceeded the "Max PPP inactivity timer" of the PDSN, then at 460, the AT will send continuous PING packets to the VoIP server, such as VoIP server 308, via the first PDSN. The size of the PING packets should be larger than the related PDSN configuration. The number of IP packets should also be larger than the threshold setting at the PDSN. The AT will not receive a response to the PING packets from the VoIP server until the AT sends more PING packets than the threshold setting at the PDSN, as illustrated by 360 of FIG. 3B. Once the AT receives an ACK from the VoIP server, it can stop sending the PING packets. Receiving the ACK from the VoIP server indicates that the first PDSN has re-synchronized the PPP connection. The AT should also reset the "PPP keep timer" at this time.

Figure 5:
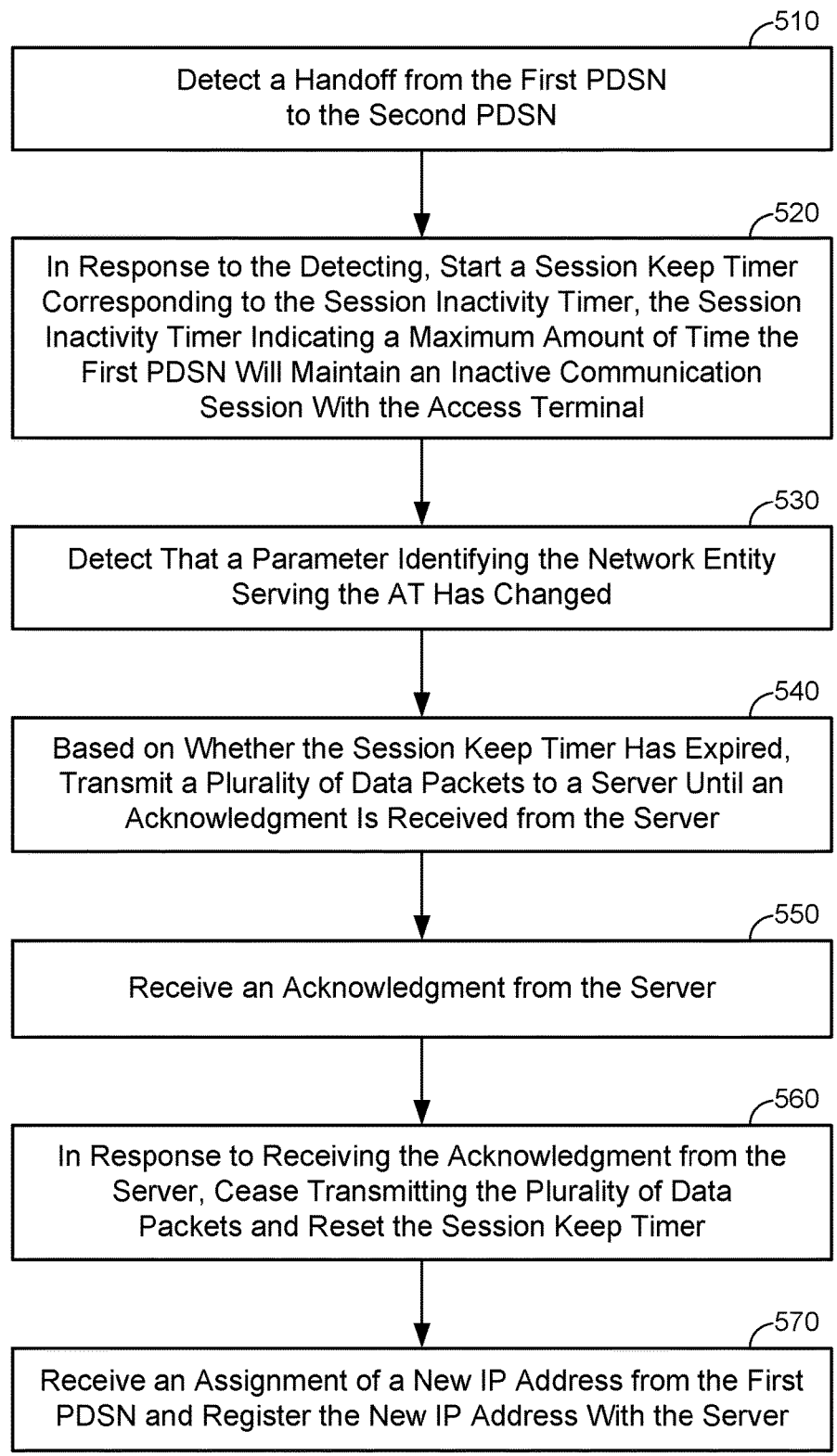

FIG. 5 illustrates an exemplary flowchart for avoiding data loss following a handoff from a second PDSN back to a first PDSN before an expiration of a session inactivity timer at the first PDSN. The flow illustrated in FIG. 5 can be performed by an AT, such as AT 302 in FIGS. 3A-B. The AT may employ Simple IP. In an aspect, the first and second PDSNs may correspond to, for example, PDSN-1 306 and PDSN-2 316, respectively, in FIGS. 3A-B.

At 510, the AT detects a handoff from the first PDSN to the second PDSN. Detecting the handoff from the first PDSN to the second PDSN may include receiving an assignment of an IP address from the second PDSN. The handoff from the first PDSN to the second PDSN may be a handoff from the first PDSN to the second PDSN while the AT is in a dormant state. The second PDSN re-synchronizes the inactive communication session in response to the handoff from the first PDSN to the second PDSN.

At 520, in response to the detecting at 510, the AT starts a session keep timer, such as the "PPP keep timer" described above, that may correspond to the session inactivity timer. The session keep timer may correspond to the session inactivity timer in that it may be the same length as the session inactivity timer. The session inactivity timer, which may correspond to the "PPP inactivity timer" described above, indicates a maximum amount of time the first PDSN will maintain an inactive communication session with the access terminal. The inactive communication session may be a PPP session.

The flow illustrated in FIG. 5 may also include detecting that a parameter identifying the network entity serving the AT has changed. The network entity may be the RAN or BSC serving the AT, and the parameter may be the Colorcode of the RAN or BSC. The session keep timer may be started at 520 in response to detecting the handoff from the first PDSN to the second PDSN and in response to detecting that the parameter identifying the RAN or BSC serving the AT has changed.

At 530, the AT detects that the parameter identifying the network entity serving the AT has changed again. In response to detecting that the parameter has changed again, the AT may determine whether or not the session keep timer has expired. As above, the network entity may be the RAN or BSC serving the AT, and the parameter may be the Colorcode of the RAN or BSC.

At 540, based on whether the session keep timer has expired, specifically, if it has, the AT transmits a plurality of data packets to a server. The server may be a VoIP server, such as VoIP server 308 in FIGS. 3A-B. The plurality of data packets may be a plurality of IP PING packets.

At 550, the AT receives an acknowledgment from the server. Receiving the acknowledgment from the server indicates that the first PDSN has re-synchronized the inactive communication session.

At 560, in response to receiving the acknowledgment from the server, the AT ceases transmitting the plurality of data packets to the server and resets the session keep timer.

At 570, the AT receives an assignment of a new IP address from the first PDSN and registers the new IP address with the server.

Figure 6:
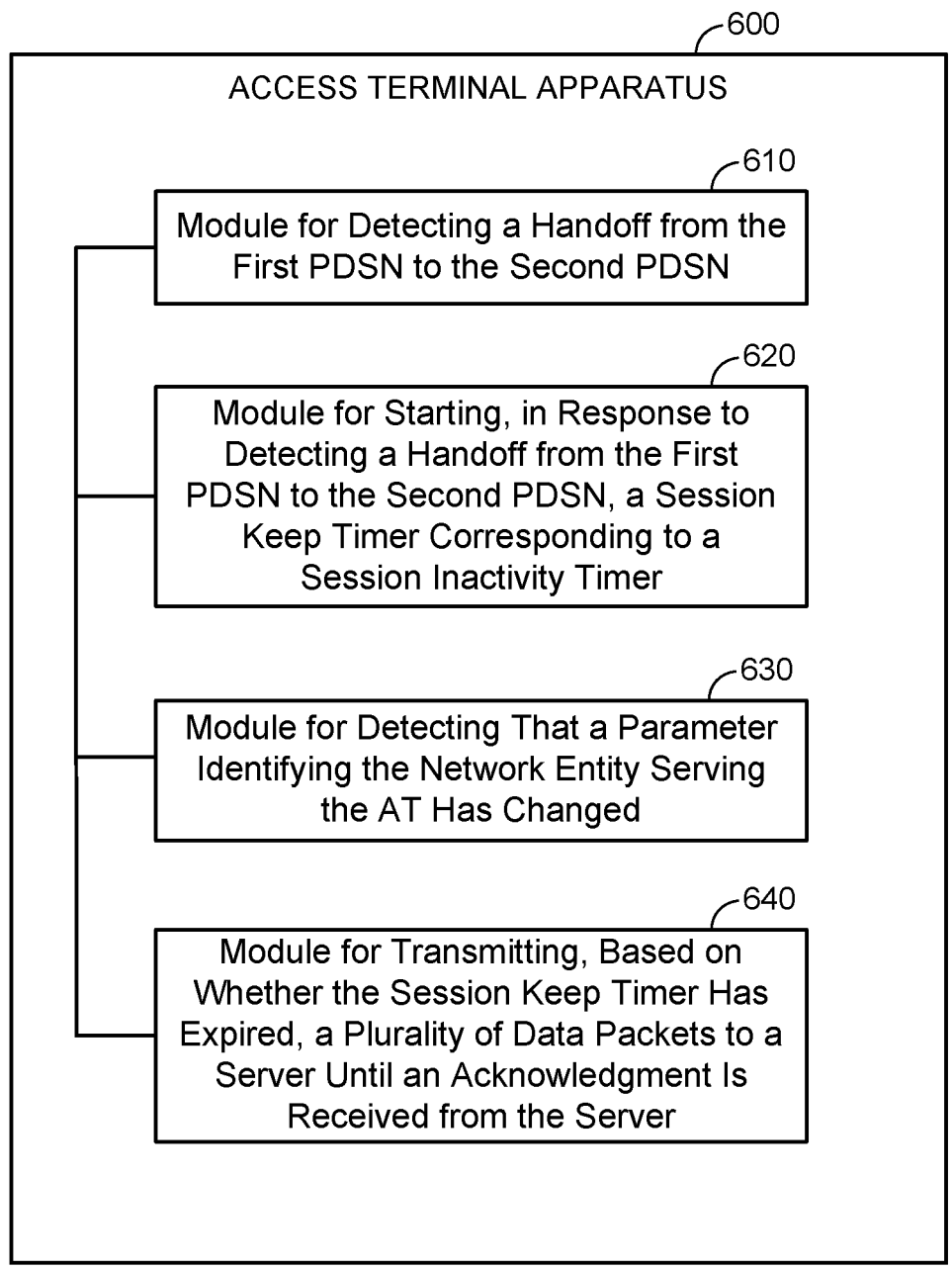

FIG. 6 illustrates an example access terminal apparatus 600 represented as a series of interrelated functional modules. A module for detecting 610 may correspond at least in some aspects to, for example, a communication device (e.g., a receiver/transceiver) as discussed herein. A module for starting 620 may correspond at least in some aspects to, for example, a processing system as discussed herein. A module for detecting 630 may correspond at least in some aspects to, for example, a communication device (e.g., a receiver/transceiver) as discussed herein. A module for transmitting 640 may correspond at least in some aspects to, for example, a communication device (e.g., a transmitter/transceiver) as discussed herein.

The functionality of the modules of FIG. 6 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 6 as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

Figure 7:
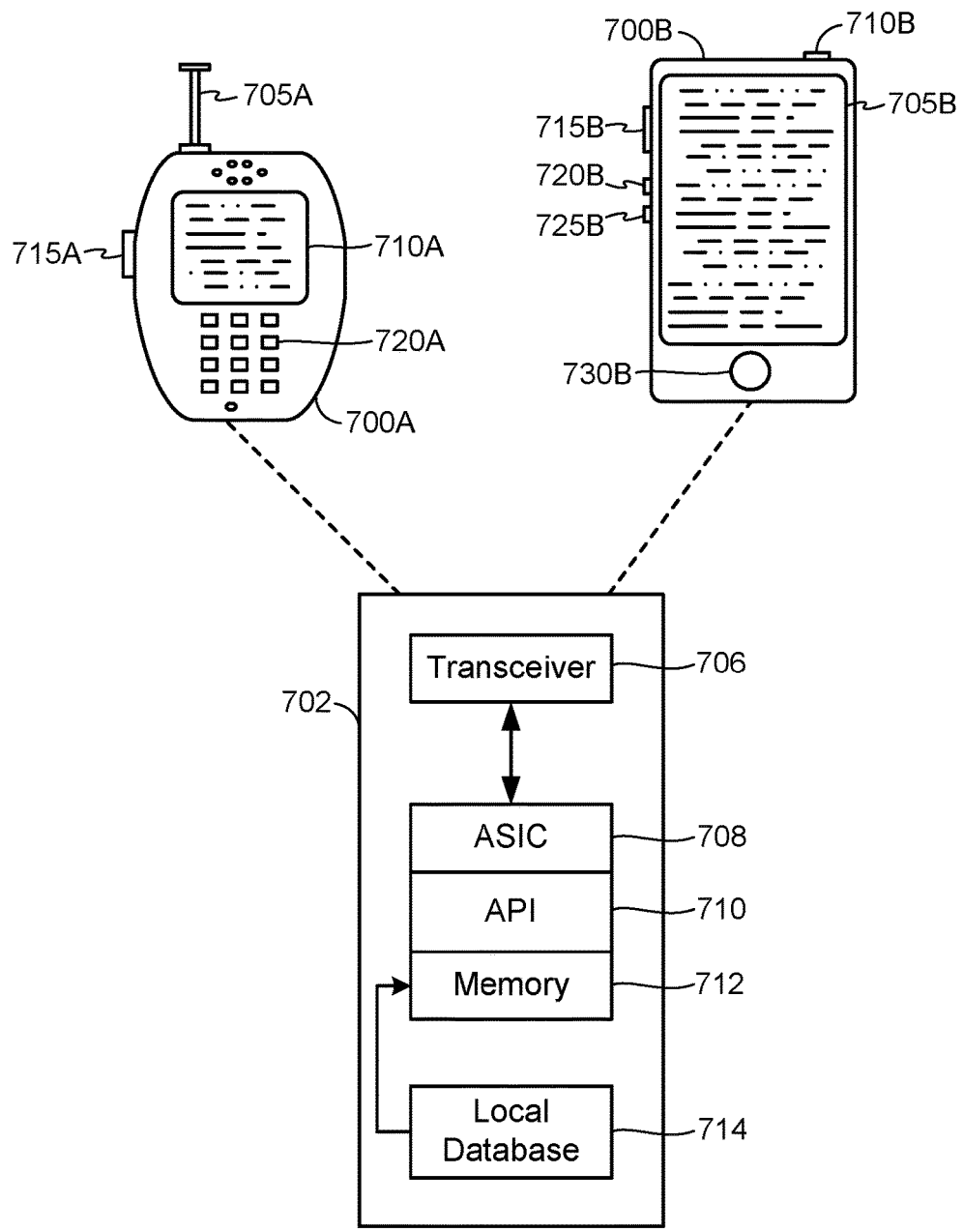
FIG. 7 illustrates examples of user equipments (UEs) in accordance with embodiments of the invention.

FIG. 7 illustrates examples of UEs in accordance with embodiments of the disclosure. Referring to FIG. 7, UE 700A is illustrated as a calling telephone and UE 700B is illustrated as a touchscreen device (e.g., a smart phone, a tablet computer, etc.). As shown in FIG. 7, an external casing of UE 700A is configured with an antenna 705A, display 710A, at least one button 715A (e.g., a PTT button, a power button, a volume control button, etc.) and a keypad 720A among other components, as is known in the art. Also, an external casing of UE 700B is configured with a touchscreen display 705B, peripheral buttons 710B, 715B, 720B and 725B (e.g., a power control button, a volume or vibrate control button, an airplane mode toggle button, etc.), at least one front-panel button 730B (e.g., a Home button, etc.), among other components, as is known in the art. While not shown explicitly as part of UE 700B, the UE 700B can include one or more external antennas and/or one or more integrated antennas that are built into the external casing of UE 700B, including but not limited to WiFi antennas, cellular antennas, satellite position system (SPS) antennas (e.g., global positioning system (GPS) antennas), and so on.

While internal components of UEs such as the UEs 700A and 700B can be embodied with different hardware configurations, a basic high-level UE configuration for internal hardware components is shown as platform 702 in FIG. 7. The platform 702 can receive and execute software applications, data and/or commands transmitted from the RAN 120 that may ultimately come from the core network 140, the Internet 175 and/or other remote servers and networks (e.g., application server 170, web URLs, etc.). The platform 702 can also independently execute locally stored applications without RAN interaction. The platform 702 can include a transceiver 706 operably coupled to an application specific integrated circuit (ASIC) 708, or other processor, microprocessor, logic circuit, or other data processing device. The ASIC 708 or other processor executes the application programming interface (API) 710 layer that interfaces with any resident programs in the memory 712 of the wireless device. The memory 712 can be comprised of read-only or random-access memory (RAM and ROM), EEPROM, flash cards, or any memory common to computer platforms. The platform 702 also can include a local database 714 that can store applications not actively used in memory 712, as well as other data. The local database 714 is typically a flash memory cell, but can be any secondary storage device as known in the art, such as magnetic media, EEPROM, optical media, tape, soft or hard disk, or the like.

Accordingly, an embodiment of the disclosure can include a UE (e.g., UE 700A, 700B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 708, memory 712, API 710 and local database 714 may all be used cooperatively to load, store and execute the various functions disclosed herein and thus the logic to perform these functions may be distributed over various elements. Alternatively, the functionality could be incorporated into one discrete component. Therefore, the features of the UEs 700A and 700B in FIG. 7 are to be considered merely illustrative and the disclosure is not limited to the illustrated features or arrangement.

The wireless communication between the UEs 700A and/or 700B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 8:
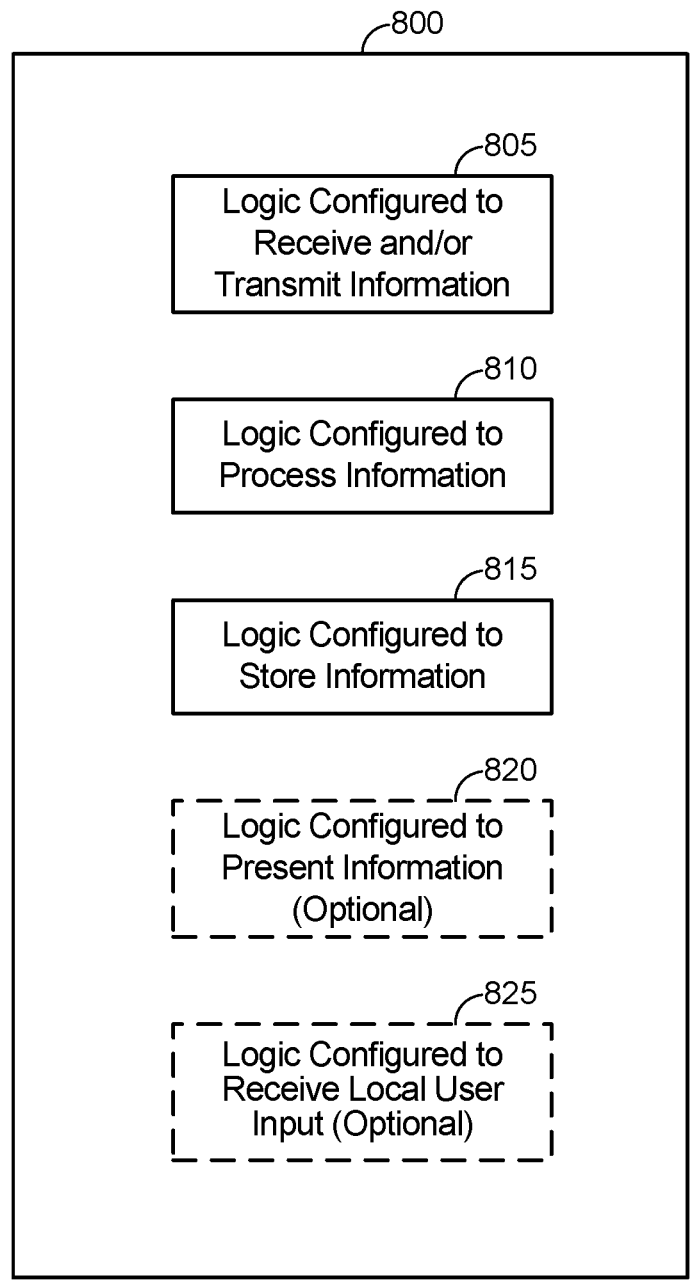
FIG. 8 illustrates a communication device that includes logic configured to perform functionality in accordance with an embodiment of the invention.

FIG. 8 illustrates a communication device 800 that includes logic configured to perform functionality. The communication device 800 can correspond to any of the above-noted communication devices, including but not limited to UEs 700A or 700B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 800 can correspond to any electronic device that is configured to communicate with (or facilitate communication with) one or more other entities over the wireless communications system 100 of FIG. 1.

Referring to FIG. 8, the communication device 800 includes logic configured to receive and/or transmit information 805. In an example, if the communication device 800 corresponds to a wireless communications device (e.g., UE 700A or 700B, one of BSs 200A through 210A, one of Node Bs 200B through 210B, one of eNodeBs 200D through 210D, etc.), the logic configured to receive and/or transmit information 805 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 805 can correspond to a wired communications interface (e.g., a serial connection, a USB or Firewire connection, an Ethernet connection through which the Internet 175 can be accessed, etc.). Thus, if the communication device 800 corresponds to some type of network-based server (e.g., PDSN, SGSN, GGSN, S-GW, P-GW, MME, HSS, PCRF, the application 170, etc.), the logic configured to receive and/or transmit information 805 can correspond to an Ethernet card, in an example, that connects the network-based server to other communication entities via an Ethernet protocol. The logic configured to receive and/or transmit information 805 can include, for example, logic configured to cause an access terminal to detect a handoff from a first PDSN to a second PDSN and logic configured to cause the access terminal to transmit, based on whether a session keep timer has expired, a plurality of data packets to a server until an acknowledgment is received from the server. In a further example, the logic configured to receive and/or transmit information 805 can include sensory or measurement hardware by which the communication device 800 can monitor its local environment (e.g., an accelerometer, a temperature sensor, a light sensor, an antenna for monitoring local RF signals, etc.). The logic configured to receive and/or transmit information 805 can also include software that, when executed, permits the associated hardware of the logic configured to receive and/or transmit information 805 to perform its reception and/or transmission function(s). However, the logic configured to receive and/or transmit information 805 does not correspond to software alone, and the logic configured to receive and/or transmit information 805 relies at least in part upon hardware to achieve its functionality.

Referring to FIG. 8, the communication device 800 further includes logic configured to process information 810. In an example, the logic configured to process information 810 can include at least a processor. Example implementations of the type of processing that can be performed by the logic configured to process information 810 includes but is not limited to performing determinations, establishing connections, making selections between different information options, performing evaluations related to data, interacting with sensors coupled to the communication device 800 to perform measurement operations, converting information from one format to another (e.g., between different protocols such as .wmv to .avi, etc.), and so on. For example, the logic configured to process information 810 can include, for example, logic configured to cause an access terminal to detect a handoff from a first PDSN to a second PDSN, logic configured to cause the access terminal to start, in response to detecting the handoff, a session keep timer corresponding to a session inactivity timer, the session inactivity timer indicating a maximum amount of time the first PDSN will maintain an inactive communication session with the access terminal, and/or logic configured to cause the access terminal to transmit, based on whether the session keep timer has expired, a plurality of data packets to a server until an acknowledgment is received from the server. The processor included in the logic configured to process information 810 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 810 can also include software that, when executed, permits the associated hardware of the logic configured to process information 810 to perform its processing function(s). However, the logic configured to process information 810 does not correspond to software alone, and the logic configured to process information 810 relies at least in part upon hardware to achieve its functionality.

Referring to FIG. 8, the communication device 800 further includes logic configured to store information 815. In an example, the logic configured to store information 815 can include at least a non-transitory memory and associated hardware (e.g., a memory controller, etc.). For example, the non-transitory memory included in the logic configured to store information 815 can correspond to RAM memory, flash memory, ROM memory, EPROM memory, EEPROM memory, registers, hard disk, a removable disk, a CD-ROM, or any other form of storage medium known in the art. The logic configured to store information 815 can also include software that, when executed, permits the associated hardware of the logic configured to store information 815 to perform its storage function(s). However, the logic configured to store information 815 does not correspond to software alone, and the logic configured to store information 815 relies at least in part upon hardware to achieve its functionality.

Referring to FIG. 8, the communication device 800 further optionally includes logic configured to present information 820. In an example, the logic configured to present information 820 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 800. For example, if the communication device 800 corresponds to UE 700A or UE 700B as shown in FIG. 7, the logic configured to present information 820 can include the display 710A of UE 700A or the touchscreen display 705B of UE 700B. In a further example, the logic configured to present information 820 can be omitted for certain communication devices, such as network communication devices that do not have a local user (e.g., network switches or routers, remote servers, etc.). The logic configured to present information 820 can also include software that, when executed, permits the associated hardware of the logic configured to present information 820 to perform its presentation function(s). However, the logic configured to present information 820 does not correspond to software alone, and the logic configured to present information 820 relies at least in part upon hardware to achieve its functionality.

Referring to FIG. 8, the communication device 800 further optionally includes logic configured to receive local user input 825. In an example, the logic configured to receive local user input 825 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 800. For example, if the communication device 800 corresponds to UE 700A or UE 700B as shown in FIG. 7, the logic configured to receive local user input 825 can include the keypad 720A, any of the buttons 715A or 710B through 725B, the touchscreen display 705B, etc. In a further example, the logic configured to receive local user input 825 can be omitted for certain communication devices, such as network communication devices that do not have a local user (e.g., network switches or routers, remote servers, etc.). The logic configured to receive local user input 825 can also include software that, when executed, permits the associated hardware of the logic configured to receive local user input 825 to perform its input reception function(s). However, the logic configured to receive local user input 825 does not correspond to software alone, and the logic configured to receive local user input 825 relies at least in part upon hardware to achieve its functionality.

Referring to FIG. 8, while the configured logics of 805 through 825 are shown as separate or distinct blocks in FIG. 8, it will be appreciated that the hardware and/or software by which the respective configured logic performs its functionality can overlap in part. For example, any software used to facilitate the functionality of the configured logics of 805 through 825 can be stored in the non-transitory memory associated with the logic configured to store information 815, such that the configured logics of 805 through 825 each performs their functionality (i.e., in this case, software execution) based in part upon the operation of software stored by the logic configured to store information 815. Likewise, hardware that is directly associated with one of the configured logics can be borrowed or used by other configured logics from time to time. For example, the processor of the logic configured to process information 810 can format data into an appropriate format before being transmitted by the logic configured to receive and/or transmit information 805, such that the logic configured to receive and/or transmit information 805 performs its functionality (i.e., in this case, transmission of data) based in part upon the operation of hardware (i.e., the processor) associated with the logic configured to process information 810.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 9:
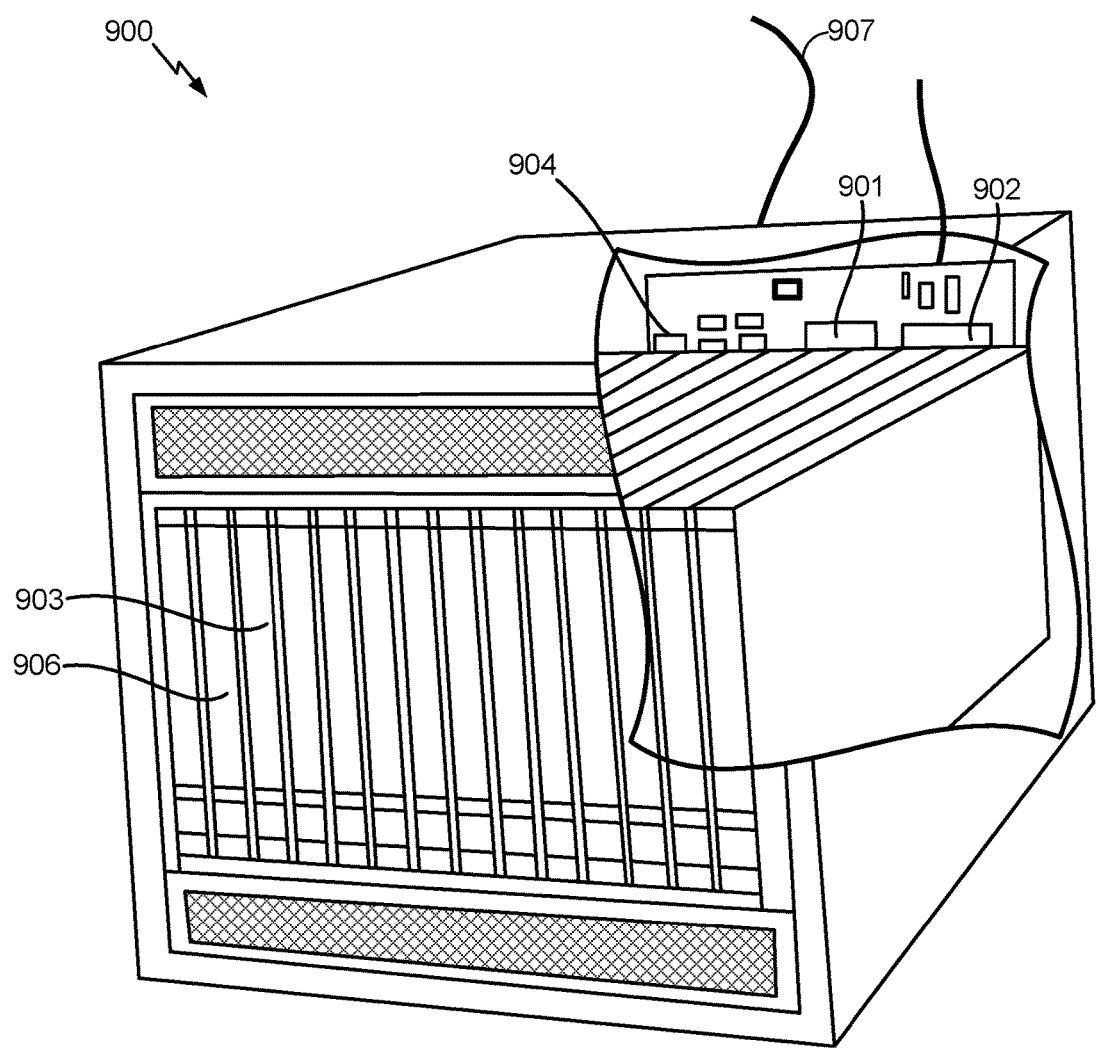
FIG. 9 illustrates a server in accordance with an embodiment of the invention.

The various embodiments may be implemented on any of a variety of commercially available server devices, such as server 900 illustrated in FIG. 9. In an example, the server 900 may correspond to one example configuration of the application server 170 described above. In FIG. 9, the server 900 includes a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 coupled to the processor 901 for establishing data connections with a network 907, such as a local area network coupled to other broadcast system computers and servers or to the Internet. In context with FIG. 8, it will be appreciated that the server 900 of FIG. 9 illustrates one example implementation of the communication device 800, whereby the logic configured to transmit and/or receive information 805 corresponds to the network access ports 904 used by the server 900 to communicate with the network 907, the logic configured to process information 810 corresponds to the processor 901, and the logic configuration to store information 815 corresponds to any combination of the volatile memory 902, the disk drive 903 and/or the disc drive 906. The optional logic configured to present information 820 and the optional logic configured to receive local user input 825 are not shown explicitly in FIG. 9 and may or may not be included therein. Thus, FIG. 9 helps to demonstrate that the communication device 800 may be implemented as a server, in addition to a UE implementation as in 705A or 705B in FIG. 7.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing description shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method for avoiding data loss following a handoff from a second packet data serving node (PDSN) back to a first PDSN before an expiration of a session inactivity timer at the first PDSN, comprising:
   detecting, by an access terminal, a handoff from the first PDSN to the second PDSN;
   in response to the detecting, starting, by the access terminal, a session keep timer corresponding to the session inactivity timer, the session inactivity timer indicating a maximum amount of time the first PDSN will maintain an inactive communication session with the access terminal; and
   based on whether the session keep timer has expired, transmitting, by the access terminal, a plurality of data packets to a server until an acknowledgment is received from the server.

2. The method of claim 1, wherein detecting the handoff from the first PDSN to the second PDSN comprises:
   receiving an assignment of an Internet protocol (IP) address from the second PDSN.

3. The method of claim 1, wherein the handoff from the first PDSN to the second PDSN comprises a handoff from the first PDSN to the second PDSN while the access terminal is in a dormant state.

4. The method of claim 1, wherein the second PDSN re-synchronizes the inactive communication session in response to the handoff from the first PDSN to the second PDSN.

5. The method of claim 1, further comprising:
   detecting that a parameter identifying a network entity serving the access terminal has changed.

6. The method of claim 5, wherein the session keep timer is started in response to the detecting the handoff from the first PDSN to the second PDSN and in response to detecting that the parameter identifying the network entity serving the access terminal has changed.

7. The method of claim 5, further comprising:
   detecting that the parameter identifying the network entity serving the access terminal has changed again; and
   in response to the detecting that the parameter has changed again, determining whether the session keep timer has expired.

8. The method of claim 1, further comprising:
in response to the transmitting, receiving an assignment of a new IP address from the first PDSN.

9. The method of claim 8, further comprising:
upon receiving the acknowledgment from the server, ceasing the transmitting and registering the new IP address with the server.

10. The method of claim 1, wherein receiving the acknowledgment from the server indicates that the first PDSN has re-synchronized the inactive communication session.

11. The method of claim 1, further comprising:
in response to receiving the acknowledgment from the server, resetting the session keep timer.

12. The method of claim 1, wherein the inactive communication session comprises a point-to-point protocol (PPP) session.

13. The method of claim 1, wherein the server comprises a voice over Internet protocol (VoIP) server.

14. The method of claim 1, wherein the plurality of data packets comprise a plurality of Internet protocol (IP) ping packets.

15. The method of claim 1, wherein the access terminal employs Simple IP.

16. An apparatus for avoiding data loss following a handoff from a second packet data serving node (PDSN) back to a first PDSN before an expiration of a session inactivity timer at the first PDSN, comprising:
a memory of an access terminal; and
at least one processor of the access terminal coupled to the memory and configured to:
detect a handoff from the first PDSN to the second PDSN;
start, in response to detection of the handoff, a session keep timer corresponding to the session inactivity timer, the session inactivity timer indicating a maximum amount of time the first PDSN will maintain an inactive communication session with the access terminal; and
cause a transmitter of the access terminal to transmit, based on whether the session keep timer has expired, a plurality of data packets to a server until an acknowledgment is received from the server.

17. The apparatus of claim 16, wherein the at least one processor being configured to detect the handoff from the first PDSN to the second PDSN comprises the at least one processor being configured to:
receive an assignment of an Internet protocol (IP) address from the second PDSN.

18. The apparatus of claim 16, wherein the handoff from the first PDSN to the second PDSN comprises a handoff from the first PDSN to the second PDSN while the access terminal is in a dormant state.

19. The apparatus of claim 16, wherein the second PDSN re-synchronizes the inactive communication session in response to the handoff from the first PDSN to the second PDSN.

20. The apparatus of claim 16, wherein the at least one processor is further configured to:
detect that a parameter identifying a network entity serving the access terminal has changed.

21. The apparatus of claim 20, wherein the session keep timer is started in response to detection of the handoff from the first PDSN to the second PDSN and in response to detection that the parameter identifying the network entity serving the access terminal has changed.

22. The apparatus of claim 20, wherein the at least one processor is further configured to:
detect that the parameter identifying the network entity serving the access terminal has changed again; and
determine whether the session keep timer has expired in response to detection that the parameter has changed again.

23. The apparatus of claim 16, wherein the at least one processor is further configured to comprising:
receive an assignment of a new IP address from the first PDSN in response to transmission of the plurality of data packets.

24. The apparatus of claim 23, wherein the at least one processor is further configured to:
cease the transmission and register the new IP address with the server upon reception of the acknowledgment from the server.

25. The apparatus of claim 16, wherein reception of the acknowledgment from the server indicates that the first PDSN has re-synchronized the inactive communication session.

26. The apparatus of claim 16, wherein the at least one processor is further configured to:
reset the session keep timer in response to reception of the acknowledgment from the server.

27. The apparatus of claim 16, wherein the inactive communication session comprises a point-to-point protocol (PPP) session.

28. The apparatus of claim 16, wherein the server comprises a voice over Internet protocol (VoIP) server.

29. An apparatus for avoiding data loss following a handoff from a second packet data serving node (PDSN) back to a first PDSN before an expiration of a session inactivity timer at the first PDSN, comprising:
means for causing an access terminal to detect a handoff from the first PDSN to the second PDSN;
means for causing the access terminal to start, in response to detection of the handoff, a session keep timer corresponding to the session inactivity timer, the session inactivity timer indicating a maximum amount of time the first PDSN will maintain an inactive communication session with the access terminal; and
means for causing the access terminal to transmit, based on whether the session keep timer has expired, a plurality of data packets to a server until an acknowledgment is received from the server.

30. A non-transitory computer-readable medium for avoiding data loss following a handoff from a second packet data serving node (PDSN) back to a first PDSN before an expiration of a session inactivity timer at the first PDSN, comprising:
at least one instruction to cause an access terminal to detect a handoff from the first PDSN to the second PDSN;
at least one instruction to cause the access terminal to start, in response to detection of the handoff, a session keep timer corresponding to the session inactivity timer, the session inactivity timer indicating a maximum amount of time the first PDSN will maintain an inactive communication session with the access terminal; and
at least one instruction to cause the access terminal to transmit, based on whether the session keep timer has expired, a plurality of data packets to a server until an acknowledgment is received from the server.

* * * * *